United States Patent [19]

Stanley

[11] Patent Number: 4,640,313

[45] Date of Patent: Feb. 3, 1987

[54] INTERLINING OF PIPELINES FOR TRANSPORTING SEWAGE, WATER, SLURRIES, LIQUID AND GASEOUS HYDROCARBONS, AND THE LIKE

[76] Inventor: Robert K. Stanley, 698 Geneva Pl., Tampa, Fla. 33606

[21] Appl. No.: 563,065

[22] Filed: Dec. 19, 1983

[51] Int. Cl.$^4$ .............. B29C 67/22; B29C 47/06; F16L 55/18; E21D 11/00

[52] U.S. Cl. .................................... 138/141; 138/97; 138/137; 156/78; 156/244.12; 156/244.13; 156/244.14; 156/287; 264/45.5; 264/46.6; 264/46.9; 264/514; 264/516; 264/565; 264/173; 264/178 R; 264/209.3; 425/133.5; 425/817 C

[58] Field of Search .............. 264/45.9, 46.1, 46.9, 264/514, 516, 565, 173, 45.5, 178, 209.3; 156/244.12, 244.13, 244.14, 78, 287; 138/141, 97, 137; 425/133.5, 817 C

[56] References Cited

U.S. PATENT DOCUMENTS

| | | |
|---|---|---|
| 2,794,758 | 6/1957 | Harper et al. |
| 2,932,323 | 4/1960 | Aries ............... 156/244.12 X |
| 3,132,062 | 5/1964 | Lang et al. ........... 156/294 X |
| 3,411,981 | 11/1968 | Thomas ............. 264/45.9 X |
| 3,467,565 | 9/1969 | Utz .................. 156/244.14 X |
| 3,726,743 | 4/1973 | Reifenhauser ....... 156/244.14 X |
| 3,956,438 | 5/1976 | Schippers .............. 264/46.1 |
| 3,957,566 | 5/1976 | Rahlfs ............... 156/244.14 X |
| 4,009,063 | 2/1977 | Wood ................ 264/269 X |
| 4,085,175 | 4/1978 | Keuchel ................. 264/51 |
| 4,141,773 | 2/1979 | Keuchel ............ 156/244.15 |
| 4,322,260 | 3/1982 | Conlon ............. 156/244.13 X |
| 4,364,882 | 12/1982 | Doucet ............... 264/45.9 |
| 4,383,812 | 5/1983 | Calcagni ........... 156/244.13 X |
| 4,386,628 | 6/1983 | Stanley ............... 264/45.9 X |
| 4,462,778 | 7/1984 | Calcagni ........... 156/244.13 X |
| 4,465,449 | 8/1984 | Hornbeck ............ 264/45.9 X |

FOREIGN PATENT DOCUMENTS

| | | | |
|---|---|---|---|
| 253637 | 5/1963 | Australia ............... | 156/244.14 |
| 2604247 | 9/1976 | Fed. Rep. of Germany ............ | 156/244.14 |
| 55-3128 | 1/1980 | Japan .................. | 264/45.9 |
| 954069 | 4/1964 | United Kingdom .... | 264/45.9 |

OTHER PUBLICATIONS

*Whittington's Dictionary of Plastics*, by Lloyd R. Whittington Stamford, Conn., Technomic, © 1968, preface; pp. 22 and 169.

*Primary Examiner*—Philip Anderson
*Attorney, Agent, or Firm*—Charles A. McClure

[57] ABSTRACT

Pipelines for transporting sewage, water, slurries, liquid and gaseous hydrocarbons, and like materials are interlined with a composite tubular lining having an inner skin layer and a foamed layer contiguous with the inner skin layer. The foamed layer is either contiguous also, along its opposite surface, with the inner wall of the pipe or may be spaced therefrom by an outer skin layer of the composite lining. The lining may be applied either before the pipeline is placed into service or afterward, whether in situ or removed for maintenance or repair. For application in situ the lining is preferably more flexible than will suffice for insertion into new pipes. The lining itself is formed by extruding polymeric tubing for the inner layer and stabilizing it dimensionally, somewhat smaller than the pipe to be lined, then applying contiguously to the layer so formed a layer of foamable polymeric material, and optionally applying to the outer surface of the foamable layer a dimensionally expansible outer skin layer. The lining is inserted into the pipe to be lined, juxtaposed circumferentially to or near the inner wall of the pipe, then the foamable layer is foamed to expand the lining against the pipe wall, thereby lining the pipe.

20 Claims, 16 Drawing Figures

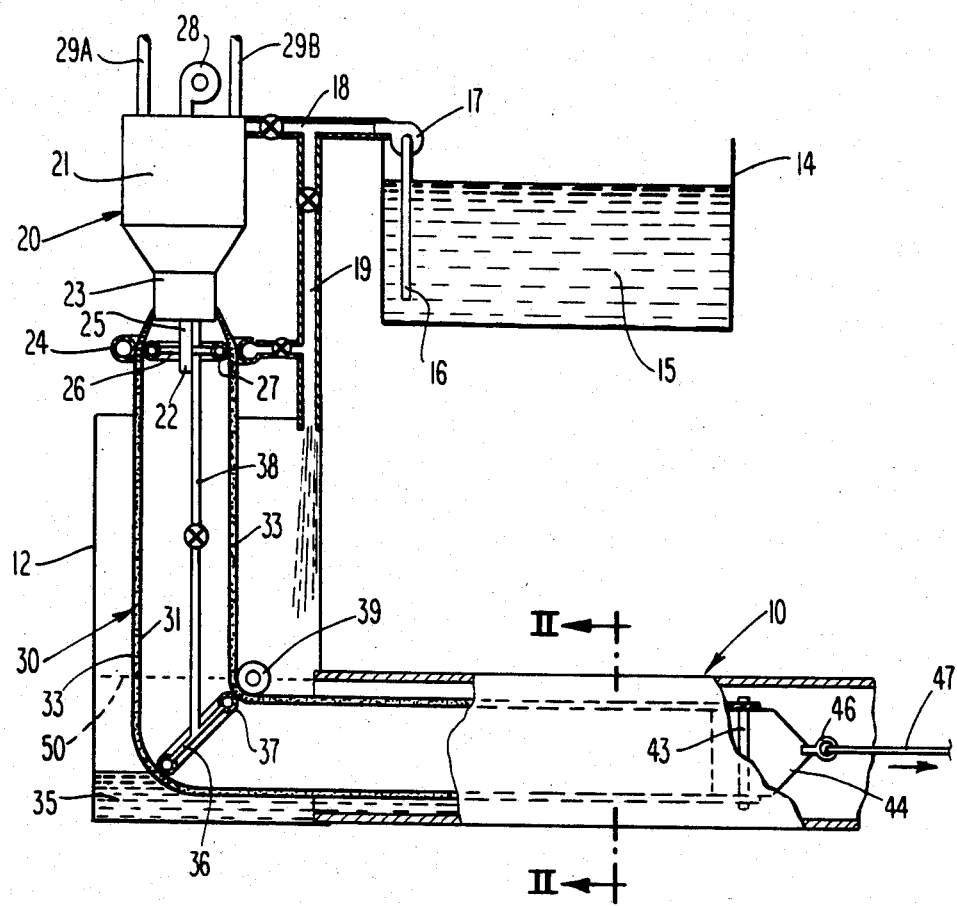
*Fig. 1*
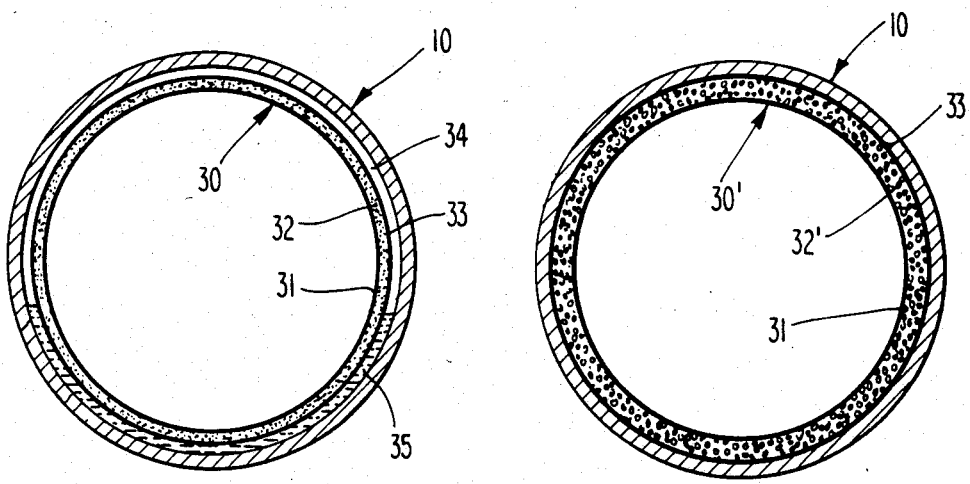
*Fig. 2*  *Fig. 3*

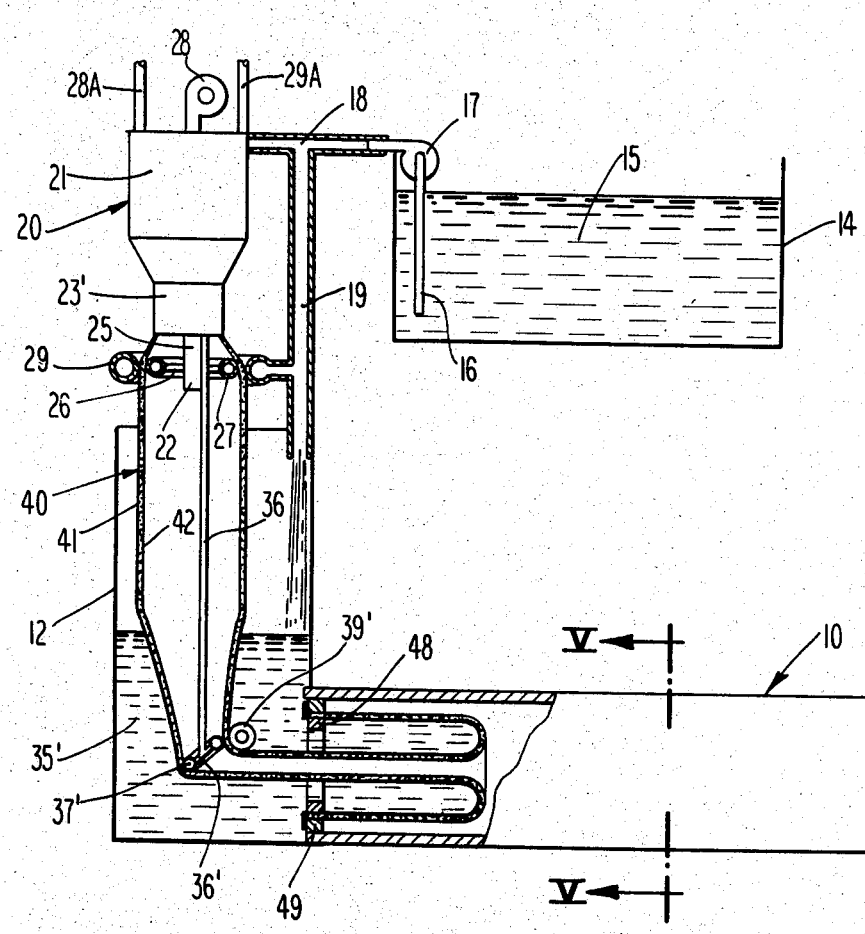
*Fig. 4*
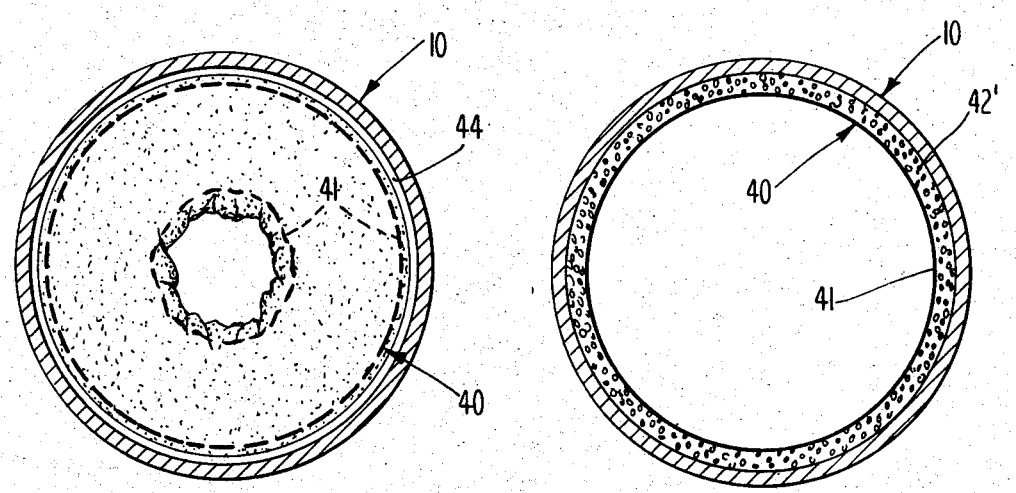
*Fig. 5*  *Fig. 6*

INTERLINING OF PIPELINES FOR TRANSPORTING SEWAGE, WATER, SLURRIES, LIQUID AND GASEOUS HYDROCARBONS, AND THE LIKE

This invention relates to lining of sewers, water pipes, and other enclosed passageways, such as pipelines for transporting slurries, liquid and gaseous hydrocarbons, reactive chemicals, or the like—whether before or after installation and use—so as to prevent leakage of the contents to the exterior and to prevent incursion of external substances thereinto when in use.

Materials and methods are known for lining passageways, such as pipes, with flexible materials (e.g., Harper et al. U.S. Pat. No. 2,794,758), some of which may be rigidifiable in place (e.g., Lang U.S. Pat. No. 3,132,062 and Wood U.S. Pat. No. 4,009,063). The present inventor has described (in U.S. Pat. No. 4,386,628) a lining method that employs a composite layered material expansible against the inside wall of a pipe or conduit; by the present invention he now extends and improves that method as a further contribution to the art of interlining transport pipelines particularly.

A primary object of this invention is leakproof interlining of pipelines for transporting sewage, water, slurries, liquid and gaseous hydrocarbons, reactive chemicals, toxic materials, etc.

Another object of the invention is adaptation of pipe linings to irregularities at the inside wall of pipes so lined.

A further object of the present invention is provision of a composite lining material suited to accomplishing the foregoing objects.

Yet another object of this invention is to assure preliminary dimensional stability of an inner skin layer of such composite lining material.

An even further object of the invention is to assure final dimensional stability of a contiguous expanded layer of such composite lining material.

Other objects of this invention, together with means and methods for attaining the various objects, will be apparent from the accompanying drawings and the following description of certain embodiments thereof, which are presented by way of example rather than limitation.

FIG. 1 is a side elevation, partly in section, of a pipe receiving a first embodiment of lining material;

FIG. 2 is a sectional end elevation of the pipe and lining material of FIG. 1 taken at II—II thereon; and FIG. 3 is a sectional view similar to FIG. 2 after completion of the pipe lining.

FIG. 4 is a side elevation with partial sectioning similar to FIG. 1 but showing the pipe receiving a modified lining material;

FIG. 5 is a sectional end elevation of the pipe and lining material of FIG. 4 taken at V—V thereon; and FIG. 6 is a sectional view similar to FIG. 5 after completion of the pipe lining.

Figure 7:
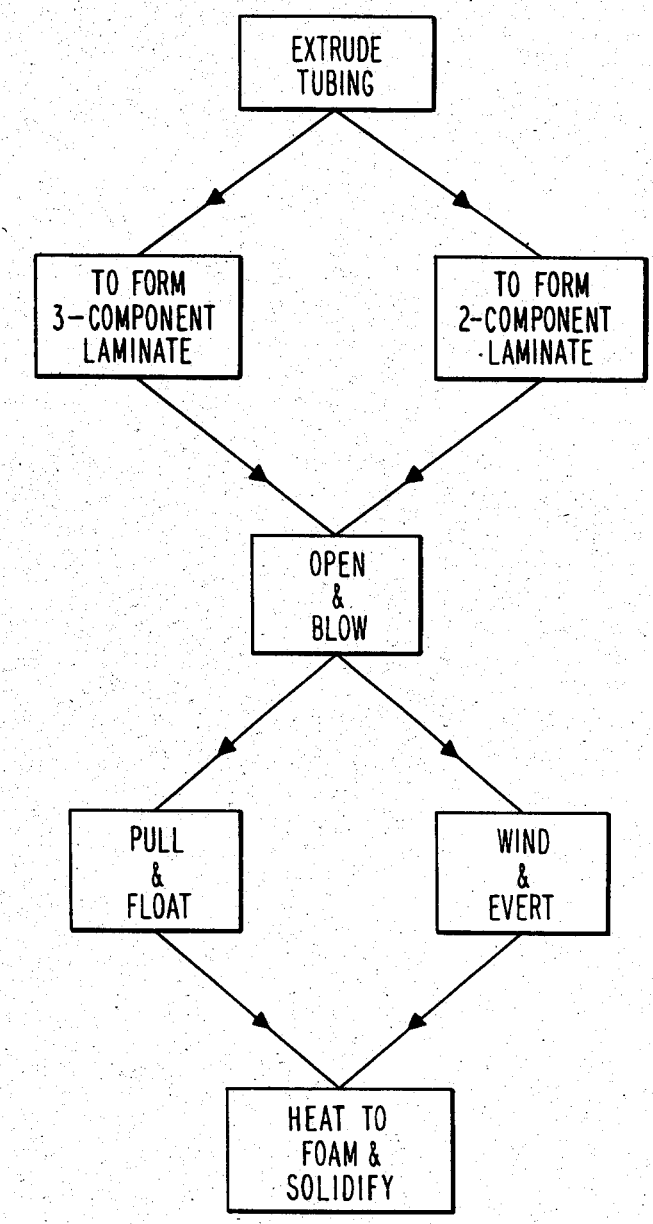
FIG. 7 is a schematic or block diagram summarizing features of the preceding views.

In general, the objects of the present invention are attained by providing, for a pipeline or similar passageway, a flexible lining material somewhat smaller so as to be insertable therein and capable of expanding outwardly in place toward and against the inner wall thereof. Application of fluid within the lining during installation aids in holding it open to its stable size and in providing desired temperature control for triggering the expansion. The lining material is composed of a dimensionally stable inner skin layer and a contiguous layer of foamable material adapted to expand outwardly upon foaming, and it may include an optional outer skin layer capable of enlarging upon such expansion of the foamable contiguous layer. The inner skin layer is dimensionally stabilized initially under appropriate temperature control and by being drawn both axially and radially (sometimes called "biaxially" or "bidimensionally") to orient the component polymeric molecules after its extrusion. The contiguous layer is preferably undrawn or only slightly drawn but is dimensionally stabilized, or even rigidified, finally upon occurrence of such foaming expansion.

FIGS. 1 to 3 show the lining of an underground sewer pipe in situ, with extrusion and related apparatus located at ground level and therebetween. FIG. 1 shows in side elevation, partly sectioned or cut away and largely schematically, sewer pipe 10 together with apparatus and materials useful in lining it. At the left end of the pipe is open-topped access enclosure 12, sometimes called a chimney or a manhole, extending thereto from above, at approximately ground level. Tank 14 containing liquid 15 (water) has pump 17 for withdrawing such liquid through intake pipe 18, connecting through piping concealed in the extruder housing to extension pipe 38 and directly into outlet 19 into enclosure 12, for reasons discussed below. Extruder 20, suitably supported at about ground level has its extrusion head 23 oriented downward into the open top of enclosure 12. Extending further concentric with the head is hollow support 25 for spider 26, which carries hollow toroidal inner ring 27. On the base at the other (upper) end of the central axis of the extruder is air pump 28, with its intake open to the atmosphere, which discharges through open end 22 of hollow support 25. The base has inlet pipes 29A and 29B for separate feed materials, which may be polymer and a blowing agent, or may be skin polymer and dissimilar foamable polymeric composition, for example.

Also shown in FIG. 1 is tubing 30 (shown in section) being formed from the extruder head and withdrawn partly by gravity and partly by withdrawal force applied to its leading end, which (in the pipe) is retained by strap 43 around block 44 with eye 46 fastened to cable 47 being pulled to the right, indicated by an arrow. Water 35 in the bottom part of the pipe lubricates and buoys up the tubing. Alternative (higher) water level 50 appears in broken lines. The tubing is expanded to the desired diameter by passage over upper inner ring 27, to which is juxtaposed hollow outer ring 24 with the tubing therebetween. The tubing is withdrawn vertically downward into enclosure 12 while being held open by injection of air (which may contain water in droplet or vapor form) from the open end of hollow support 25 as provided thereto by pump 28. The tubing passes under idler roller 39 at the bottom of the enclosure and around second ring 37, which is canted, and then horizontally into pipe 10. Respective upper and lower inner rings 27, 37 are supported on spiders 26, 36; the former directly on hollow nose tube 22 of the extruder head, and the latter on extension tube 38, which communicates (through the head) with an upper branch of pipe 18. The extension tube extends downward from the head and alongside the nose tube to the axis level of pipe 10. Upper outer ring 24 is supported on a lower side branch of pipe 18. All three rings, also hollow, can receive water internally from their hollow supporting means. Each ring has small peripheral openings so as to wet the adjacent surface of the flexible tubing to whatever extent (if any) may be desired and thereby facilitate its passage over the ring surface. At rings 24 and 27 wetting can perform the additional function, as desired, of quenching the hot tubing and thereby rendering it (or enabling it to become) dimensionally stable—the skin permanently and the expansible contiguous layer temporarily. Upper ring 27 performs the additional function of enlarging to desired size the hitherto dimensionally unstable tubing, which is stabilized thereby and by the aforementioned concurrent or subsequent quenching.

FIG. 2 shows the resulting cross-sectional appearance (on an enlarged scale) of the resulting tubular lining inside the pipe. It is a 3-component laminate with inner skin layer 31, outer skin layer 33, and contiguous intermediate foamable layer 32 (shown stippled) sandwiched by the skin layers. The annular space shown between the outer skin and the inside wall of the pipe is occupied by water in the lower portion and by air in the upper portion. When the tubing has been pulled to the other end (not shown) or other accessible intermediate part of the pipe, the pulling and the extrusion are stopped, and the injected air is heated, or hot water is circulated in contact with the tubing, to cause layer 32 to expand by foaming, as explained more fully below.

FIG. 3 shows similarly the cross-sectional appearance of the resulting lined pipe. Previous layer 32 of foamable composition has expanded to force outer skin 33 against the inside wall of the pipe, and the resulting cellular layer (shown with small circles) is designated 32' to indicate the change in its structure. The former annular space partly occupied by water and air is now absent, being occupied by the expanded lining. Solidification of the intermediate layer in the expanded cellular configuration with the outer skin forced thereby against the inside wall of the sewer pipe provides the pipe with a permanent in-place liner 30'.

FIGS. 4, 5, and 6 similarly illustrate practice of such lining method modified by using a 2-component tubular lining material lacking one of the skin layers shown in the previous diagrams. Most of the features shown are identical with those of the earlier views and accordingly are identified with unchanged reference numerals, whereas new features are designated by other numerals. For clarity, the tubing and its component layers here are also given numbers different from (higher by ten) the previous ones.

FIG. 4 shows pipe 10, extruder 20, enclosure 12, tank 14, and related features essentially unchanged, except that smaller canted ring 37' replaces the previous one, and roller 39' is relocated accordingly relative to the location of roller 39 before. Tubing 40 here is produced on modified extruder head 23' with skin layer 41 on the outside—whereas previous skin layer 31 of tubing 30 was on the inside—and with contiguous layer 42 (stippled) nearer the tubing axis. Water 35' is maintained in enclosure 12 at a level above the top edge of the pipe, and the tubing collapses from the water pressure outside it as it passes below the liquid surface, then over small canted ring 37' and below idler roll 39'. The leading edge of the tubing is secured to the end of the pipe by compression between respective inner and uter rings 48 and 49, the latter of which fits tightly and seals the tubing thereto. As the tubing is forwarded, the water forces it into and along the length of the pipe, turning the tubing inside out ("everting" it).

FIG. 5 shows the appearance of the everting tubing 40 seen in the indicated direction from a not yet occupied cross-sectional location. Visible throughout most of this interior view of the pipe is layer 42 of foamable composition, which is being everted from the inside to the outside of the tubing. Annular space between the tubing and the pipe is filled by air 44 (ring 48 is too far from the plane of the view to be visible here). Skin layer 41, being behind contiguous layer 42, is shown in broken lines to locate it for the viewer; it is a narrow everting surface as two adjacent lengths of the skin layer bend through an abrupt direction reversal. After the pipe length is filled with an equal length of the tubing, the water is heated or is replaced with hot water to trigger foaming and expansion of the foamable layer into contact with the inside wall of the pipe, whereupon it solidifies.

FIG. 6 shows the resulting cross-sectional appearance. Foamed layer 42' of resulting lining 40' extends from inner skin 42 to the pipe wall, there being no distinct outer skin as before.

FIG. 7 schematically summarizes the two foregoing methods by sequence of steps. Those steps unique to the first several views are at the left; those unique to the second set of diagrams are at the right; and those steps common to both are in a central column. According to the first, one would extrude polymeric material into a 3-component tubular laminate, expand the tubing and blow to keep it open, pull and float it into and along the pipe, and heat it to foam and to solidify the foamable layer in place as a permanent lining for the pipe. Or, by the second method, one would instead extrude polymeric material to form a 2-component tubing, open the tubing and blow to keep it open, wind it, and evert it into and the along the pipe, then heat to expand and solidify the foamable layer of the tubing in cellular configuration. Alternatively, a hybrid of the two could be undertaken, by producing a 2-component tubing with the stable skin layer on the inside (at right, FIG. 7) and pulling it through the pipe without eversion (left, FIG. 7).

Figure 8:
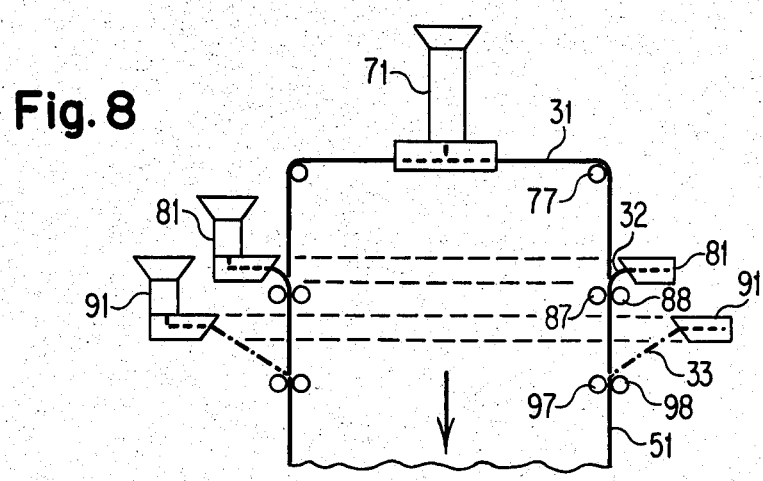
FIG. 8 is a side elevation, partly in section, of making and installing lining in a pipe according to this invention.

FIG. 8 shows the tubing formation in more detail though still rather schematically, omitting (as understood) such temperature-control and tubing-opening means as blowers, in the interest of clarity. Here, simultaneously operating but conveniently separate extruders 71, 81, and 91 are shown for producing individual layers 31, 32, and 33 of the tubing material. Extruder 71 is centrally located at the top of the view to extrude radially outward, while extruders 81 and 91 (fragmentarily shown) are circumferentially located relative to the formed tubing so as to extrude inward toward the tubing. First, extruder 71 extrudes inner skin layer 31 of polymer radially outward horizontally to pass through about a quadrant of arc over ring 77 and directly downward, being drawn to extended length and reduced circumference in the process. Next, extruder 81 extrudes layer 32 of foamable material radially inward and through about a quarter circle of arc over ring 88 onto the outer surface of layer 31, whose inner surface is backed up by ring 87. Finally, optional outer skin layer 33 is extruded inwardly by extruder 91 and is preferably quenched and reheated by attached means (much as shown at the outwardly radial extruder of FIG. 11) so that this outer skin layer relaxes biaxially on its way obliquely downward to join the tubing proper. It passes over ring 98 onto the outer surface of foamable layer 32, while the inner surface of inner skin layer 33 is backed up by ring 97.

The composite tubing so formed, here designated 51, proceeds on downward for processing as shown in succeeding views 9A and 9B, presented as alternative continuations of the showing in FIG. 8. The next following pair of views (FIGS. 10A and 10B) show the pipe wall and resulting alternative linings. Details of a suitable ring structure appear in the last three diagrams (FIGS. 11 to 14).

Figure 9A:
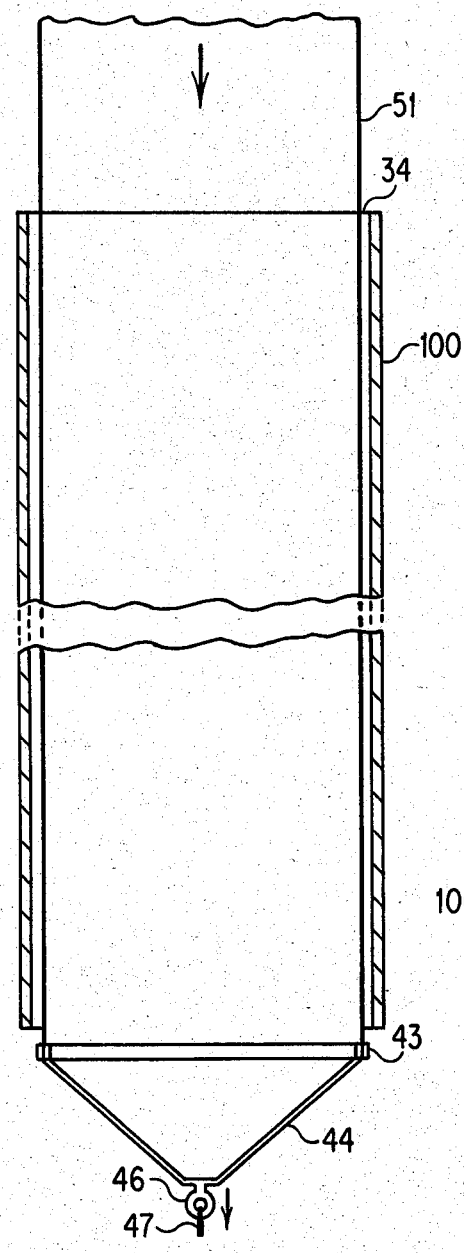
FIG. 9A is a sectional elevation through a pipe wall being lined with tubular material produced according to FIG. 8.

FIG. 9A shows tubing 51 proceeding downward into pipe 100 and therethrough, juxtaposed near to the inside wall of the pipe. It is pulled along both by gravity and by force applied via cable 47 through eye 46 attached to block 44 inserted in the open end of the tubing and secured thereto by surrounding clamp 43. This pipe may be understood as unused, not yet part of a transport pipeline, or (alternatively) as part of an installed sewer or other pipeline such as one needing maintenance or repair. The illustrated axial orientation (vertical) is merely convenient rather than mandatory.

Figure 9B:
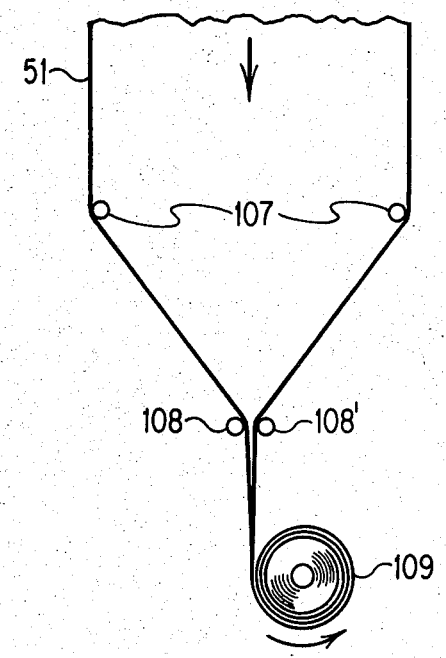
FIG. 9B is a partially sectional elevation of tubular material produced according to FIG. 8, being wound up for pre-use storage.

FIG. 9B shows tubing 51 again proceeding downward but over ring 107 and then gathered inward to pass between pair of driven parallel nip rolls 108, 108' after which it winds onto rotating package 109 for temporary storage, which may be remote from a pipe to be lined therewith. An outer skin layer is useful here to preclude successive wraps of the tubing from adhering to one another. Subsequent unwinding of the tubing to line a pipe needs no illustration; air blown inside then will help open it.

Figure 10A:
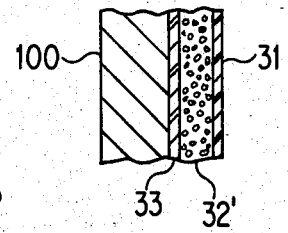
FIG. 10A is a fragmentary transverse section through the pipe wall of FIG. 9A, lined with tubular material of FIG. 8.
Figure 10B:
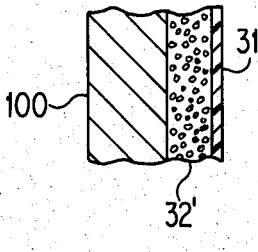
FIG. 10B is a view similar to FIG. 10A but showing the same pipe wall lined with an alternative tubular material of FIG. 8.

FIG. 10A shows, in fragmentary section, pipe wall 100 lined with the 3-layer tubing, with outer skin layer 33 against the pipe wall and with foamed contiguous layer 32 sandwiched between the outer and inner skin layers, similar to FIG. 2. FIG. 10B shows similarly the 2-layer lining, which lacks outer skin layer 33, so that the expanded foam layer lies against the inside wall of the pipe as well as against inner skin layer 31, much as in FIG. 3.

Figure 11:
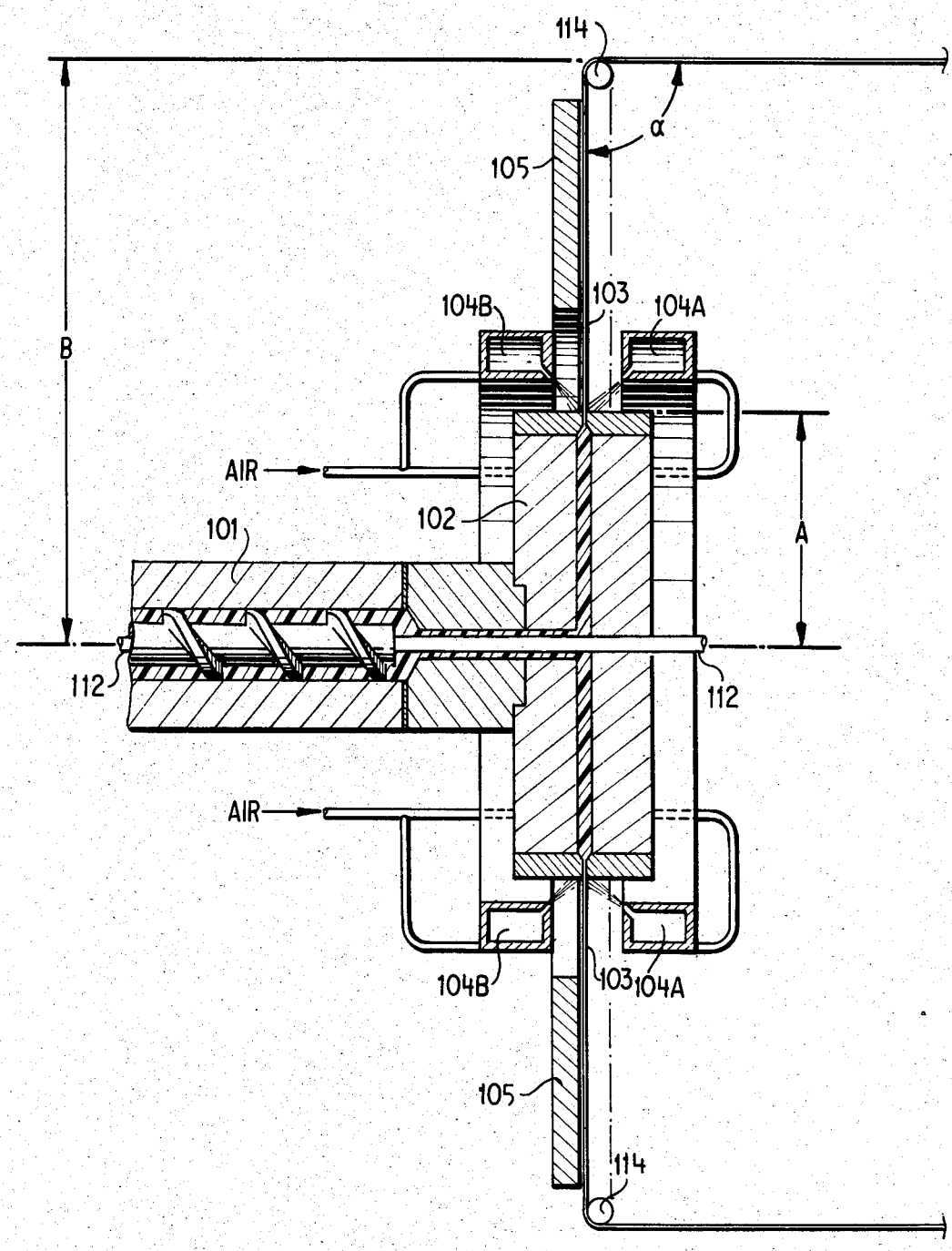
FIG. 11 is an axial cross section of apparatus useful in the practice of the present invention.

FIG. 11 shows, in axial section, as a more detailed example of extrusion apparatus useful as extruder 71 of FIG. 8, extrusion housing 101 with an internal screw impeller for molten polymeric composition therein (melting chamber omitted) and radial extrusion head 102 connected thereto by a transition chamber (unnumbered). Annular air-rings 104A and 104B surround the head at opposite sides of emerging polymer sheet or layer 103, with air outlets open theretoward for temperature adjustment thereof. Annular plate 105 is juxtaposed to one side of layer 103, also for temperature adjustment thereof. For example, cool air from the air-ring outlets quenches the layer from its extrusion temperature, such as several hundred degrees, to a lower temperature (such as about a hundred degrees), below the polymer melting or flow temperature, after which the plate reheats it to an intermediate temperature, preferably above the glass transition temperature of the polymer, thereby promoting drawing of it to dimensional stability. The draw ratio is B/A, where B is the radius of the outer extent of ring 114, which surrounds the extrusion head at a slightly greater radius than the outermost extent of plate 105; whereas A is the radius of the radial extrusion slot in the extruder head. The extruded layer passes though about a quarter circle of arc about ring 114, which is designed to forward it in the desired direction (rightward).

Figure 12:
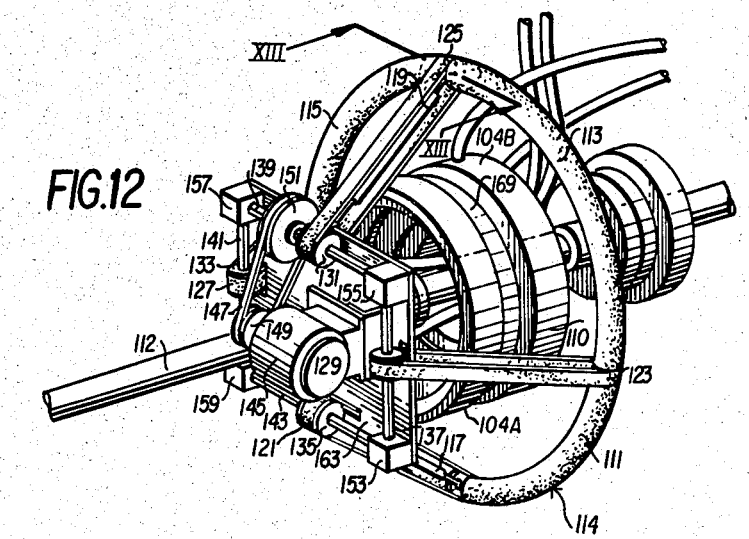
FIG. 12 is a perspective view of the apparatus of FIG. 11 and associated apparatus.
Figure 13:
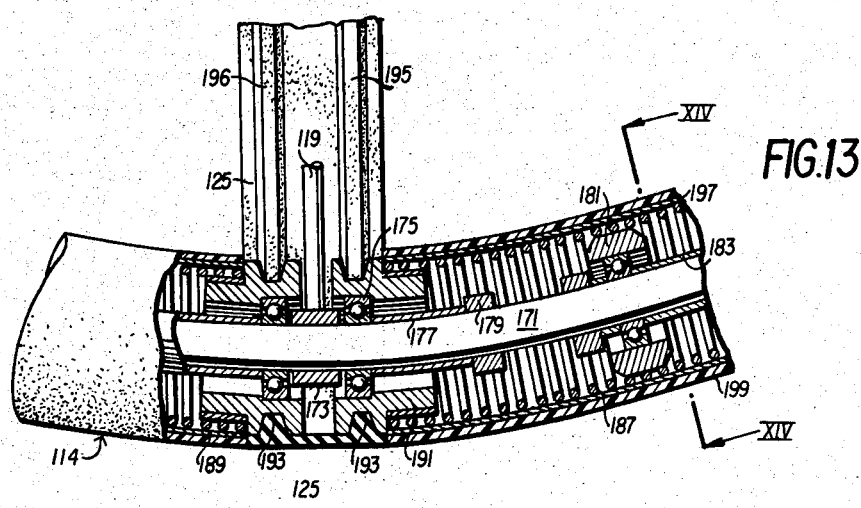
FIG. 13 is an axial section through part of the apparatus of FIG. 12 taken at XIII—XIII thereon.
Figure 14:
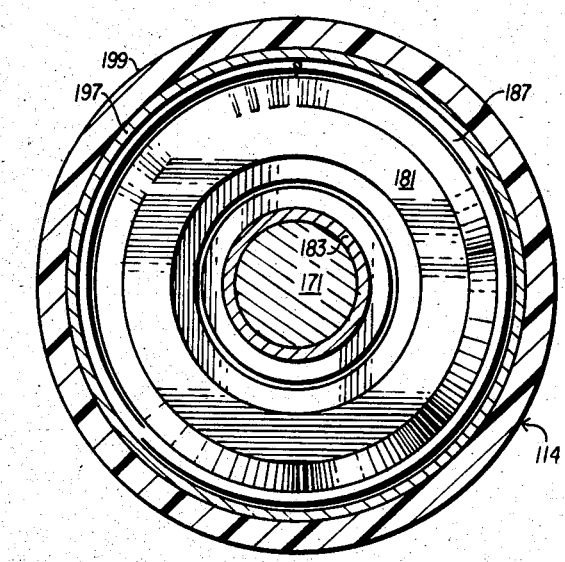
FIG. 14 is a transverse section through part of the apparatus of FIG. 13 taken at XIV—XIV thereon.

Ring 114, shown in perspective in FIG. 12, fragmentarily in partial section in FIG. 13, and in fragmentary transverse section in FIG. 14, is suitable for rings over which tubular liner layers pass in FIG. 8 and previous views, as where positive forwarding is desired, with or without any desired change in forwarding speed. No invention is claimed here in such a ring, which is derived from one disclosed in Keuchel U.S. Pat. Nos. 4,085,175 and 4,141,773 for a somewhat different use. Optionally the drive mechanism may be omitted to provide a similar idler roll as backup or guide means where some drag is acceptable in lieu of fixed rings that may be employed for like purposes.

FIG. 12 shows tubular hollow shaft 112, by which all the other elements in this perspective view are supported: extruder 110 (a support-modified FIG. 8 extruder 71 omitting FIG. 11 details for simplicity of illustration) and mounting plate 163 (directly), also ring 114 and its attachments (indirectly via the mounting plate). Ring 114 comprises rotatable arcuate quadrants 111, 113, 115, and 116 whose junctions receive supporting arms, such as 117 and 119 visible here (and two others, not visible), which extend obliquely thereto from the plate.

FIG. 13 shows in greater detail, sectioned as indicated, the junction of such quadrants 115 and 113 supported by arm 119, which terminates in holder 173 for circular shaft 171, carrying idler roll 181 and driven rolls 189 and 191. The latter are rotated by belt 125 from pulley 131 driven by belt 147 and pulleys 151 and 149, the former on belt pulley shaft 139, and the latter on the shaft of motor 129 affixed to plate 163 (FIG. 12). Pulleys for the other belts are mounted on shafts 137, 141, 143 driven in like manner through interconnecting right-angle gear pairs 155, 159, 157; an example is pulley 133 for belt 127 on shaft 141.

FIG. 13 shows belt 125 with pair of longitudinal alignment flanges 195, 196 fitting into recesses 193 in respective pulleys 191 and 189. Counterpart belt 123 appears at the junctions of quadrants 111 and 113 (FIG. 12). Both driven and idler pulleys on shaft 171 support segmented helical roll lengths 187, each of them carrying fabric sleeve 197 and surrounding elastomeric roll cover 199, whose ends abut the edges of adjacent driven roll pairs. The rolling surface is accordingly continued throughout the peripheral surface of ring 114, for uninterrupted support of tubular material passing thereover.

FIG. 14 shows ring 114 in transverse section at the location of idler roll 181. Visible in addition to such roll itself are surrounding fabric sleeve 197 and elastomeric roll cover 199, and central shaft 171 with spacer 183 between it and the idler roll. Ring diameters from about a half foot to several feet in diameter are readily assembled from roll parts of essentially invariant diameter but different lengths of arcuate shaft, helical roll, and both fabric and elastomeric roll covers.

The illustration of four roll segments is merely exemplary of a convenient number, as fewer or more may be used depending upon ring diameter. It will be understood that the linear speed of the rotating roll cover can be controlled by adjusting the drive motor speed—or by altering the intervening pulley or gear ratios—so as to control the forwarding rate of tubing passing thereover.

Hollow shaft 112, like shaft 22 of previous views, is adapted to conduct fluid, typically hot air, from outside the tubing to the interior space surrounded thereby. This enables the tubing to be held open to its initial diameter for juxtaposition to the wall of the passageway to be lined, as described elsewhere herein.

Depending upon the composition used for it, the inner skin layer may be subjected to draw ratios (B/A in FIG. 11) in the range from about 2X to 6X (i.e., times an undrawn dimension) to enhance its dimensional stability. Proper temperature control is important during drawing, as it is in the previous step of polymer extrusion, and as it is in forming the resulting flexible tubing comprising a foamable layer, and also in optionally storing and transporting such tubing and installing it without activating the foaming agent too soon, and finally in activating the foaming agent when desired so as to complete installation of the lining. However, every material and every installation differ somewhat from every other, and both material selection and suitable control of temperature are well within the capabilities of persons skilled in polymer extrusion, tubing formation, and pipe lining. Ability to line pipes competently, whether by this or another method, is best developed on the job, with the benefit of this specification.

Thermoplastic polymeric compositions are preferred for forming the skin layer(s), such as medium density homopolymers, copolymers, or interpolymers of ethylene, propylene, and/or butene; such inert polymers are suitable for lining most pipelines and, because of their lack of toxicity, are especially suitable in pipes for water intended for human or animal consumption or for crop irrigation. Even if the foam layer contains—which it need not do—noxious catalysts or traces of toxic unreacted or byproduct chemicals, the inner skin will seal them off from the transported liquid. Lining materials for reactive chemicals will pose similar problems and should be selected for specific tolerance to such chemicals.

Other skin layer compositions include acrylic polymers, such as of methyl acrylate and methyl methacrylate; vinyl and vinylidene polymers, such as their chlorides; linear polyesters, such as polyethylene terephthalate; polyamides, such as polycaprolactam and polyhexamethylene adipamide; thermoplastic polyurethanes; cellulose esters of lower aliphatic acids, such as acetic acid, propionic acid, or butyric acid; polyacetals; and polycarbonates. Abrasion-resistant compositions, such as the noted nylons, are especially suited to use in pipelines for slurries of coal, etc. Pipelines for gaseous hydrocarbons and other gases are usually under considerable internal pressure, which may fluctuate widely; the lining material should tolerate such conditions well enough, as the polyacetals can be expected to, and also the polycarbonates. The nature of the foam composition, as well as the skin material, can be expected to be a factor in some of the more exotic uses.

Many monomeric or low polymeric precursors of the polymers for the skin layer(s) are suited (together with appropriate additives) for inclusion in the foamable layer. In addition to being less dense, the foam layer may exhibit different physical characteristics, relative to the skin layer, such as rigidity instead of flexibility, insofar as both foaming and rigidification of the foamable layer are delayed until the tubing is in place inside a pipe to be lined thereby. Such rigidity can result from as small a change as extending the time of polymerization (as by continued heating) or may depend upon more catalyst (such as a peroxide) or added multifunctional crosslinking agents (such as diols), or may be enhanced by providing a copolymerizable ingredient from the same chemical category or even from a different one (e.g., styrene). Indeed, some of the simpler materials may become thermoset when sufficiently crosslinked, or even by inclusion of conventional epoxy or melamine-, phenol-, or urea-formaldehyde thermosetting components. Reaction rates may be more rapid with on-site extrusion and are designedly slow when off-site extrusion is followed by appreciable periods of storage or transportation of the still flexible tubular lining material. One method of inhibiting reaction is preadjustment of pH away from the reactive range, thus to higher values where acid-reactive, or to lower pH values where alkaline-reactive, so long as increasing the temperature will overcome the inhibition—as it usually will.

Foaming may be provided by an ingredient used as a catalyst, cross-linking agent, or even as a copolymerizable component, if it (or its reaction with another component) produces a gaseous product, such as ammonia (e.g., from amines), carbon dioxide (e.g., from carbonates), lower hydrocarbon (e.g., from esters), acidic vapor such as hydrogen chloride (e.g., from acids), or water vapor (e.g., from acids and alcohols). Selection of such ingredients that react little at ordinary ambient temperatures and below but that react adequately at elevated temperatures below the boiling temperature of water is within ordinary chemical skills.

Catalysts, in addition to organic materials such as suggested above, include hybrid organo-metallic compositions, e.g., aluminum alkyl (such as trimethyl); also metal salts, e.g., zinc, nickel, or cobalt chlorides—and oxides of such metals. It will be understood that catalyst selection is highly dependent upon the polymeric components being processed, of course. Conventional choices are readily made and are likely to be suitable. Optimal selection is less readily made because of the wide variety of possible catalysts and operations. Materials as simple as ammonium carbonate and sodium bisulfite can function both as catalyst and foaming agent with a wide range of polymerizable materials, e.g., acrylics, vinyls, and even acetals.

Processing parameters include not only temperature, which has been emphasized above, but also extruded layer thicknesses, rates of extrusion and forwarding, draw ratio for the inner skin layer and relaxation ratio for the outer skin layer (if any). The pipe dimension to be lined (actually the inside circumference although usually loosely specified in terms of the equivalent "diameter") determines the values of these parameters to a large extent. A small pipe makes less of a demand upon skin layer strength and might suffer a capacity loss from a thick liner, whereas a large pipe requires a strong inner skin, thicker foam layer, and should even undergo any increase in capacity upon being lined despite the consequent loss in cross-sectional area—because of a substantial reduction in coefficient of surface friction. In a one-foot pipe the lining thickness should be about 5 to 15 mm, and for a three-foot pipe about 20 to 50 mm. In general, the finished thicknesses of foam layer and inner skin should be in a ratio range from about 5:1 to 25:1. Spcial cases may dictate other extremes.

As an example, in a 1-ft. water pipe, the extruded thicknesses of the inner skin layer and foamable layer (no outer skin layer) are set equal to 3 mm each, the skin layer (polyethylene) is drawn 3X, the foam layer (polyethylene) is thickened 4X, the resulting total lining thickness is 13 mm, and the thickness ratio is 12:1. As another example, in a 3-ft. sewer pipe, with identical extruded thicknesses of 6 mm for inner skin and foamable layers, the skin layer (polypropylene) is drawn 4X, foam layer (polyvinyl chloride) is thickened 5X; total lining thickness is 31.5 mm, and thickness ratio 20:1. In a variant on the last example, an outer skin layer (polypropylene) is extruded with a thickness of 2 mm and is relaxed 25%; the resulting lining is 33 mm thick. The foam layers include a gaseous (or gasified) blowing agent residue, such as carbon dioxide, of course.

Advantages of this invention have been noted above and will become fully apparent to those who undertake to practice it, along with other benefits, to those who enjoy such benefits by having pipes lined thereby or receiving materials transported via such pipelines. Economy of maintenance is a prime consideration for pipes made—as they all are—of degradable materials, especially those whose installation and interruption costs either approach or exceed their purchase price, even with this lining added.

Although preferred embodiments of the present invention are shown and described here, useful modifications may be made, as by spraying or coating the foamable layer onto the inner skin, or coating the inside wall (of a clean pipe) with catalyst for prompt foaming of the layer—however applied—upon contact with the pipe. Other revisions may be made, as by adding, combining, deleting, or dividing parts or steps, while retaining advantages and benefits of the invention, which itself is defined in the following claims.

The claimed invention:

1. In preparing for lining a pipe with composite tubular materials fitting thereinto and having an inner skin layer and contiguous expansible layer, the improvement comprising extending the skin layer biaxially at least about 2X before juxtaposing the expansible layer into lateral contiguity therewith.

2. Pipe lining method according to claim 1, wherein the two layers are so juxtaposed before being inserted into the pipe.

3. Pipe lining method according to claim 1, wherein an outer skin layer is juxtaposed into lateral contiguity with the opposite side of the expansible layer.

4. Pipe lining method according to claim 3, wherein the outer skin layer is relaxed biaxially before being so juxtaposed.

5. Method of lining a pipeline or similarly circumferential passageway-defining structure, comprising extruding a tubing of polymeric material and dimensionally stabilizing the material, than juxtaposing into lateral contiguity with the outer surface thereof an outwardly expansible layer comprising polymerized material, inserting the composite tubing so formed into and along the inside wall of such structure and juxtaposing it thereto, then heating the tubing and thereby expanding the expansible layer against the wall.

6. Passageway lining method according to claim 5, wherein the expansible layer expands by foaming into cellular form.

7. Passageway lining method according to claim 6, wherein the expansible layer also solidifies in such expanded form.

8. Pipeline or similarly circumferential passageway-defining structure lined according to the method of claim 5.

9. Method of providing lining for a pipeline or similarly circumferential passageway structure, comprising juxtaposing adherently to the outer surface of a tubing of flexible polymeric material dimensionally stabilized by having been drawn biaxially at least about 2X a layer of foamable material expansible upon foaming and solidifiable in expanded form, and deferring expansion and solidification thereof until the lining is in place therewith.

10. Passageway lining method according to claim 9, wherein the extruded tubing is biaxially drawn about 4X in stabilizing it dimensionally.

11. Passageway lining method according to claim 10, including extruding another tubing of polymeric material, heat relaxing it to a smaller circumference approximating the outer circumference of the expansible layer, and adhering it to the outside surface of the expansible layer.

12. Passageway lining method according to claim 9, including inserting the lining into a passageway structure, juxtaposing the lining to the inside wall of the passageway structure, and heating the lining in place, whereupon the foamable material foams and, in doing so, expands until constrained by the inside wall.

13. Passageway lining method according to claim 12, including thereafter cooling the lining in place, whereupon the foamable material rigidifies.

14. Pipeline or similar structure lined according to the method of claim 9.

15. Method of providing lining for a pipeline or similarly circumferential structure, comprising forming a tubing of flexible polymeric material, biaxially drawing the tubing at least about 2X to increased size, circumferentially somewhat less than the size of the structure to be lined thereby, juxtaposing adherently to the outer surface of the tubing a foamable layer of thermoplastic material adapted to expand upon foaming and to solidify in expanded form when the lining is in place within the structure to be lined.

16. Pipeline lining method according to claim 15, including foaming the foamable material and thereby expanding its outermost circumference until it is constrained by the inside wall of the structure to be lined and solidifying the foamed material in place.

17. Pipeline or similar structure lined according to the method of claim 16.

18. Pipeline lining method according to claim 15, including forming another tubing of flexible polymeric material, larger in circumference than the layer of foamable material, heat-relaxing the second tubing and thereby diminishing its circumference to approximate that of the outer surface of the foam layer, and then juxtaposing the second tubing adherently onto the outside of the layer of foamable material on the first tubing.

19. Pipeline lining method according to claim 18, including foaming the foamable material and thereby expanding the outermost circumference until it is constrained by the inside wall of the circumferential structure and solidifying the foamed material in place.

20. Pipeline or similar structure lined according to the method of claim 19.

* * * * *